UNITED STATES PATENT OFFICE.

HERMAN G. C. PAULSEN, OF NEW YORK, N. Y., ASSIGNOR TO HORATIO N. FRYATT, OF SAME PLACE.

IMPROVEMENT IN REFINING SUGAR.

Specification forming part of Letters Patent No. 30,108, dated September 18, 1860.

*To all whom it may concern:*

Be it known that I, HERMAN G. C. PAULSEN, of the city and county of New York, and State of New York, have invented a new and useful improvement in the mode of making or extracting crystallizable sugar out of the cane and other saccharine substances, and also in the mode of refining raw sugars and molasses; and I do hereby declare that the following is a full and exact description thereof.

The nature of my invention consists in dissolving and boiling the raw sugar or molasses in a liquid possessing the property to coagulate and precipitate all the impurities contained in the raw sugar, which impurities consist in vegetable albumen, earthy salts, and other impurities mechanically mixed in the raw sugar.

To enable others skilled in the art of making, refining, and boiling of sugars to use my invention, I will proceed to describe its application and operation.

In a closed vessel connected by pipes and other suitable fixtures with a condenser I dissolve the sugar or the molasses in a combined liquor composed of seventy-five per cent., per weight, of alcohol of 60° and twenty-five per cent. sulphuric ether, and of this combined liquor the same amount, per weight, as the crude sugar or molasses intended to be operated on in one operation. Having mixed the sugar in this combined liquor, I begin to heat up by steam,·for which purpose all the required fixtures must be attached to the vessel, stirring the mixture continually by means of a stirrer entering the closed vessel by a tight stuffing-box. I heat up till bubbles begin to rise rapidly on the surface of the mixture, which must be carefully attended to. At this time, the mixture showing a temperature of about 160° Fahrenheit, the connections of the main vessel with the condenser must be closed. Continue to heat up by constant stirring till the temperature reaches 180° Fahrenheit. At this temperature I keep the solution for about twenty minutes. At the expiration of this time I draw off the solution in another closed vessel, and let stand now to cool down and settle off, which usually takes six or eight hours. In this stage of the operation all the impurities contained in the sugar settle down, and the sugar solution is rendered perfectly pure, clear, and transparent. Now it is drawn into another closed vessel, from which it is run into a closed boiler with a condenser, where the sugar solution is boiled down. The vapors rising at the boiling of the combined liquid of alcohol and sulphuric ether are condensed to be used again in other operations.

What I claim as my invention, and desire to secure by Letters Patent, is—

The application of alcohol of a certain strength, in combination with sulphuric ether in the proportion as herein stated and at a degree of heat of the boiling-point of said combined liquors, and then at 10° or 15° Fahrenheit above it to raw sugars and molasses for the purpose of refining and purifying said raw sugars and molasses, as herein stated.

New York, May 2, 1860.

HERMAN G. C. PAULSEN.

Witnesses:
M. H. KRUGER,
FREDERICK LANGMAN.